(12) United States Patent
Zika

(10) Patent No.: US 9,778,139 B2
(45) Date of Patent: Oct. 3, 2017

(54) LOAD STRUCTURE FOR TESTING A LOADABILITY OF A LARGE BEARING AND LOAD TESTING METHOD

(71) Applicant: Thomas Zika, Haag (AT)

(72) Inventor: Thomas Zika, Haag (AT)

(73) Assignee: AKTIEBOLAGET SKF, Gothenburg (SE)

( * ) Notice: Subject to any disclaimer, the term of this patent is extended or adjusted under 35 U.S.C. 154(b) by 44 days.

(21) Appl. No.: 14/869,276

(22) Filed: Sep. 29, 2015

(65) Prior Publication Data

US 2016/0091395 A1  Mar. 31, 2016

(30) Foreign Application Priority Data

Sep. 29, 2014  (DE) .................. 10 2014 219 727

(51) Int. Cl.
*G01M 13/04* (2006.01)
*G01M 13/00* (2006.01)

(52) U.S. Cl.
CPC ............ *G01M 13/04* (2013.01); *G01M 13/00* (2013.01); *G01M 13/005* (2013.01); *G01M 13/045* (2013.01)

(58) Field of Classification Search
CPC .... G01M 13/04; G01M 13/045; G01M 13/00; G01M 13/005
USPC ........................................................ 73/788
See application file for complete search history.

(56) References Cited

U.S. PATENT DOCUMENTS

| | | | | |
|---|---|---|---|---|
| 3,324,708 A | * | 6/1967 | Staph | F16C 19/00 374/153 |
| 4,175,430 A | * | 11/1979 | Morrison | F16C 19/30 73/862.541 |
| 5,763,772 A | * | 6/1998 | Bywalez | F16C 35/063 73/114.81 |
| 2012/0227462 A1 | * | 9/2012 | Craig | F16C 19/52 73/7 |

FOREIGN PATENT DOCUMENTS

| | | |
|---|---|---|
| DE | 102005056389 A1 | 6/2006 |
| DE | 102006021707 A1 | 11/2007 |
| DE | 102012224423 A1 | 7/2014 |
| JP | 2011033352 A | 2/2011 |
| WO | 2014101983 A1 | 7/2014 |

* cited by examiner

*Primary Examiner* — Lisa Caputo
*Assistant Examiner* — Nathaniel T Woodward
(74) *Attorney, Agent, or Firm* — Bryan Peckjian; SKF USA Inc. Patent Dept.

(57) ABSTRACT

A load structure for testing a loadability of a large bearing includes a housing, a force-transmitting structure configured to generate a force or a moment relative to the housing and to transmit the force or the moment to a bearing ring of the large bearing, and a force-receiving element connected to the housing and configured to contact a counter ring of the large bearing. The housing is configured to support the counter ring indirectly via the force-receiving element such that the transmitted force or moment is transmitted to the housing at least partially via the counter ring and the force-receiving element, and a material of the force-receiving element has a higher degree of hardness than a material of the housing. Also a method of load testing a bearing.

19 Claims, 3 Drawing Sheets

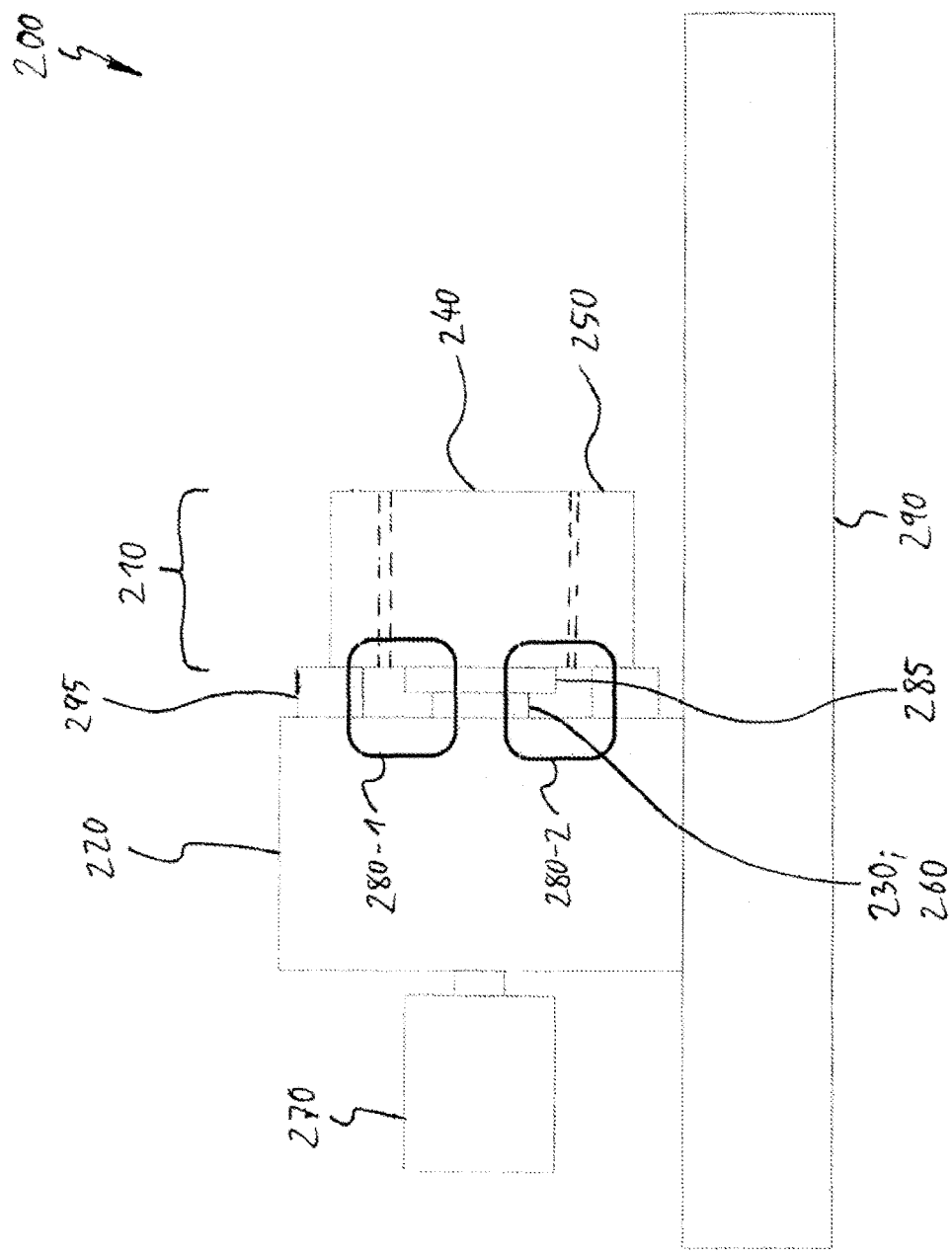

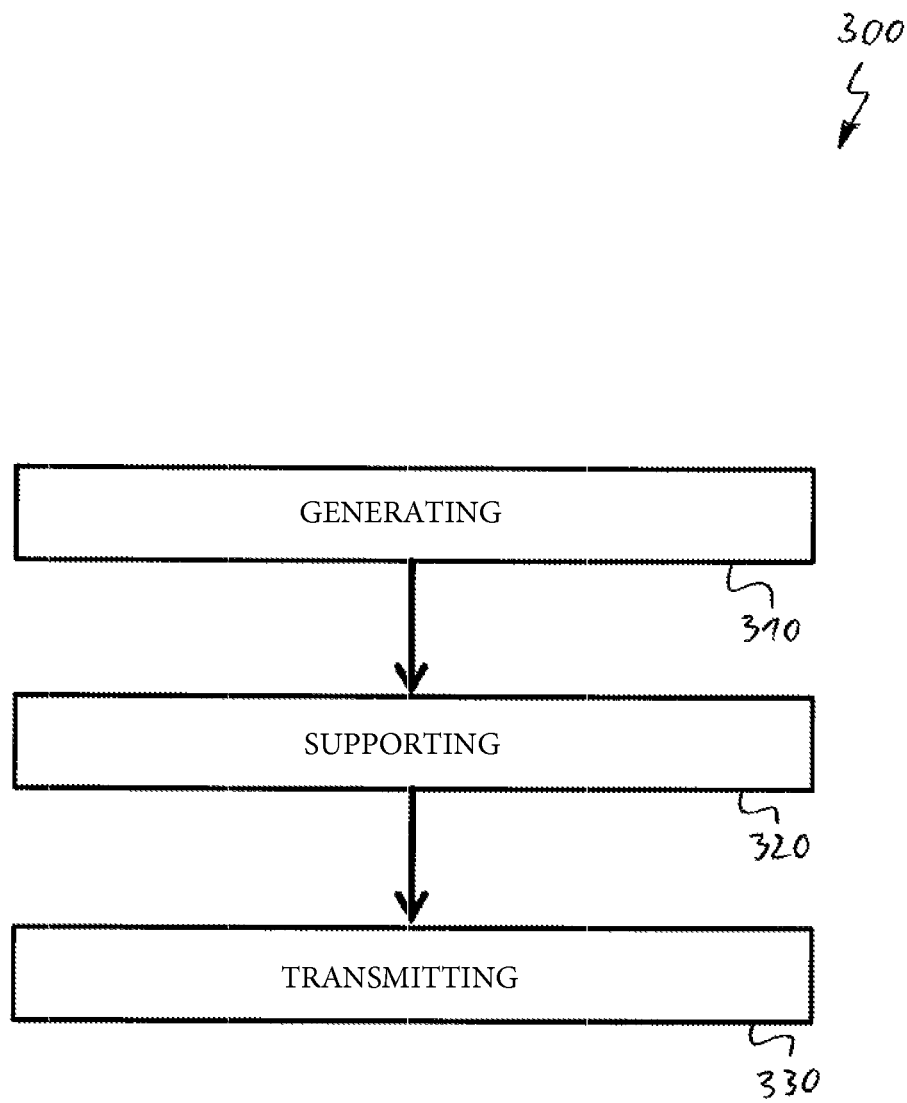

LOAD STRUCTURE FOR TESTING A LOADABILITY OF A LARGE BEARING AND LOAD TESTING METHOD

CROSS-REFERENCE

This application claims priority to German patent application no. 10 2014 219 727.9 filed on Sep. 29, 2014, the contents of which are fully incorporated herein by reference.

TECHNOLOGICAL FIELD

The present disclosure is directed to load structures for applying forces to components such as large bearings for the purpose of testing the effect of the load on the component and to a load testing method.

BACKGROUND

In many areas of technology it is necessary to perform load tests on components before they are installed or used. Devices are known for applying loads/forces to or against components. The devices also include structures that counteract or resist the applied forces, that is, structures that hold at least a portion of the tested component in place while the forces are applied. The nature and magnitude of the applied force or forces depend on the size of the components and the forces that they are expected to encounter when in use.

Such load tests are sometimes performed in the field of wind energy. Components to be tested may include, for example, gondolas of wind turbines, bearing assemblies, and/or individual large bearings. However, due to the size and nature of the components to be tested, relatively large forces need to be applied. The structures that resist these forces, that is, that hold the object to be tested in place against the application of a test force, likewise may need to be very large. This takes up unnecessary space and may affect the stability of the test device or a foundation of the test device. Conventional devices may lack adequate stiffness to handle the test forces. Furthermore, it may be difficult to access or view a test object because of an arrangement of the testing device, and this can complicate a load test. Furthermore, the dimensioning requirements and stability requirements for accommodating large loads can lead to additional costs. These or similar problems can also arise when load testing components intended for use outside the wind energy field.

FIG. 1 shows a conventional device 100 for load testing a large bearing 110. The device 100 includes a load-generating unit 130 and a load-reaction unit 140 attached to a foundation 120. The load-generating unit 130 comprises a shaft 150 that is coupled on one end to a motor 160 and that carries the large bearing 110 on an opposite end. The load-reaction unit 140 contacts or connects to the large bearing 110.

The load-generating unit 130 is configured to exert an axially or radially acting force or a moment, e.g., torque, on the shaft 150, which force is transmitted to the bearing 110. In addition, the motor 160 can rotate the bearing 110. The load-reaction unit 140 resists or acts against the force. In other words the load-reaction unit 140 resists the force so that the force acts at least partially on the bearing 110 instead of, e.g., pushing the bearing away from the load-generating unit 130. The force is transmitted via a force-transmission path 170 shown in the form of a closed loop. In other words, the force is applied against or received at least partially by the shaft 150, the bearing 110, the load-reaction unit 140, the foundation, and the load-generating unit 130.

A portion of the generated force that acts on the bearing 110 can be at least 4 MN, and a torque applied on the bearing 110 can be at least 10 MNm. This may correspond to loads that may be encountered by the bearing 110 when used in a wind turbine. It can be difficult for a load-reaction unit 140 to resist such large forces, and accommodating such forces can place unnecessarily high requirements on a stability of the device 100 or its components, e.g., the load reaction unit 140, the foundation 120, or the load-generating unit 130. Furthermore, under certain circumstances this device 100 can have an inadequate stiffness (inadequate to resist applied forces), occupy an unnecessarily large amount of space (because the load-reaction unit must be made very large to accommodate expected forces), or entail high manufacturing costs. In addition, the bearing 110 may be difficult to access or see, and thus difficult to monitor during a test.

SUMMARY

It is therefore desirable to provide a load structure configured to have an improved compromise of installation-space requirements, cost, accessibility of a test object, and performance.

According to a first aspect, exemplary embodiments relate to a load structure for testing a loadability of a large bearing. The load structure comprises a housing and a force-transmitting structure. The force-transmitting structure is configured to generate a force or a moment relative to the housing and to transmit the force or load to a first bearing ring of the large bearing. The load structure also comprises a force-receiving element connected to the housing, which force-receiving element contacts or abuts a second ring (counter ring) of the large bearing. In this embodiment, the housing is configured to support the second ring indirectly via the force-receiving element such that the force or the moment is transmitted via the second ring and the force-receiving element at least partially to the housing. The force-transmitting element may be formed of a material that has a higher degree of hardness (higher hardness grade) than a material of the housing. This arrangement allows for a reduction in the number of required components, which components can require additional installation space. This can additionally reduce the cost of the load structure. In other words, a more compact design can be achieved, and this may lead to an increased stiffness of the structure. The configuration of the force-receiving structure of the embodiment also makes the test object easier to see and access. Thus it may be possible to better monitor load tests, or it may be possible to attach additional sensors to the test object. In addition, it may be possible to reduce wear due to the higher hardness of the material of the force-receiving element.

In some exemplary embodiments the force-transmitting structure further comprises a shaft connected to the bearing ring. The shaft is configured to transmit the force or the moment to the bearing ring in the radial or axial direction. This allows for the load test to replicate conditions that may occur in actual use including forces applied in a plurality of force directions.

In some exemplary embodiments the housing comprises at least three bores configured to receive one or more attachment devices for attaching the force-receiving element to the housing. This allows for a stable fixing for a test object via the force-receiving element and can increase a security or reliability of the test process.

In some exemplary embodiments the force-receiving element is at least partially partial-ring shaped. Under certain circumstances a more uniform receiving and transmitting of the generated force to the housing can thus be effected by the force-receiving element.

In some exemplary embodiments the load structure further comprises an adapter ring that includes a radial indentation. The adapter ring is configured to couple the force-transmitting structure onto the bearing ring of the large bearing such that the bearing ring is in abutment with the radial indentation. This can allow large bearings having different inner- or outer-radii to be attached to the load structure and tested. In other words, an adapting to an inner- or outer-radius of the bearing can thereby be effected.

In some exemplary embodiments the housing is at least partially manufactured from a material whose mass fraction of iron is greater than its mass fraction of any other element. This can allow a use of materials that have an increased stability or durability.

According to another aspect, exemplary embodiments relate to a method of load testing for testing a loadability of a large bearing. The method comprises generating a force by a force-transmitting structure of the load structure relative to a housing of the load structure to or against a bearing ring of the large bearing. The method further comprises supporting a counter ring of the large bearing against the housing indirectly via a force-receiving element connected to the housing. A material of the force-receiving element may have a higher degree of hardness than a material of the housing. The method further comprises transmitting the force via the counter ring and the force-receiving element at least partially to the housing. This helps reduce the number of components of the testing device and thereby reduces the installation space required for a load test device. This can additionally reduce the manufacturing cost of the load structure.

Further advantageous elements of the disclosure are described in more detail below with reference to exemplary embodiments depicted in the Figures, but are not limited to said exemplary embodiments.

BRIEF DESCRIPTION OF THE DRAWINGS

FIG. 2 is a schematic illustration of a load structure for load testing an object according to an exemplary embodiment.

FIG. 3 is a flow diagram illustrating a method for load testing an object according to an exemplary embodiment.

DETAILED DESCRIPTION

Figure 1:
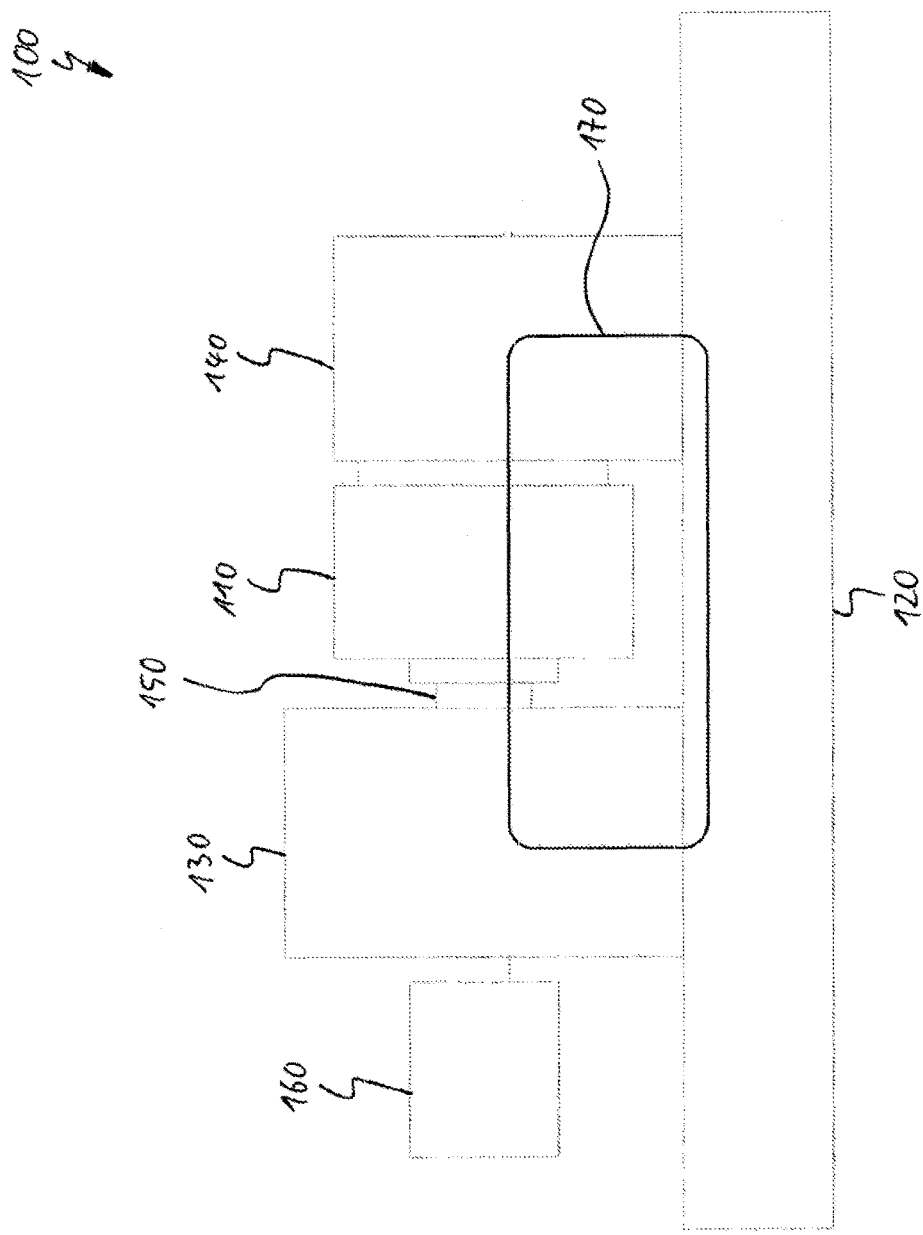
FIG. 1 is schematic illustration of a conventional device for load testing an object.

In the following description of the accompanying Figures, like reference numerals refer to like or comparable components. Furthermore, summarizing reference numerals are used for components and objects that appear multiple times in an exemplary embodiment or in an illustration, but that are described together in terms of one or more common features. Components or objects that are described with the same or summarizing reference numerals can be embodied identically, but also optionally differently, in terms of individual, multiple, or all features, their dimensions, for example, as long as the description does not explicitly or implicitly indicate otherwise.

Exemplary embodiments offer improvements over conventional load structures. An exemplary embodiment of a load structure 200 for load testing (testing a loadability of) a large bearing 210 is shown in FIG. 2. The load structure 200 comprises a housing 220 and a force-transmitting structure 230. The force-transmitting structure 230 is configured to generate a force or a moment, e.g., a torque, a torsional moment, a load moment, or a bending moment relative to the housing 220 and to transmit it to a bearing ring 240, for example, the inner ring, of the large bearing 210. The housing 220 is also configured to support a counter ring 250 of the large bearing (e.g., the outer ring) so that the force or the moment applied to the inner ring is transmitted via the counter ring 250 at least partially to the housing 220.

This embodiment reduces the number of components used which in turn can reduce the amount of installation space required. This can additionally reduce manufacturing costs for the load structure 200. In other words, a more compact design can be achieved, which may lead to an increased stiffness of the structure.

The large bearing 210 may comprise, for example, a sliding bearing or a rolling-element bearing, which bearing has an outer diameter of at least 600 mm. Furthermore, large bearings can have a diameter of up to 1500 mm, up to 4000 mm, or even more. In addition to large bearings, the load structure 200 can furthermore be configured to test a loadability of a bearing assembly that includes a plurality of bearings, or even, for example, further components of a wind turbine, such as, for example, a gondola. The bearing ring 240 can be, for example, an inner ring or an outer ring, and the counter ring 250 can be an outer ring or an inner ring.

The load structure 200 may be or comprise a test bench or a testing system. A loadability can be characterized by a load limit, and the load limit can be defined, for example, as breakage of some component, or by some component reaching a stoppage marker, or by an amount of noise that occurs in response to a load, or by a malfunction (such as, e.g., a locking), abrasion, or a temperature development above a prespecified temperature.

In some exemplary embodiments the force-transmission structure 230 further comprises a shaft 260 connected to the bearing ring. The shaft 260 is configured to transmit the force or the moment to the bearing ring in a radial or an axial direction. The load structure can comprise, e.g., an actuator or also pneumatic or hydraulic elements that apply a force between the housing 220 and the force-transmitting structure 230, and thereby effect a displacement of the shaft 260 in the radial or axial direction. In this way forces to which the large bearing 210 may be exposed during use can be simulated, for example, forces caused by the weight of a structure (e.g. wind turbine) or an environmental condition (e.g. frontal or lateral wind). Furthermore, the shaft 260 in FIG. 2 is coupled to a motor 270 that can rotate the shaft 260 and thus the bearing ring 240 with a prespecified torque. The motor 270 can optionally be supported by the housing 220 or the foundation 290. This can make possible a load test under expected operating conditions. Here the force can be at least 4 MN and up to 8 MN, but it can also be more or less. The torque can, for example, fall in a range of from 10 to 80 MNm.

Here the force is transmitted by the force-transmitting structure 230 to the large bearing 210 and absorbed by the housing 220 with the force-transmitting structure being in direct or indirect abutment with the large bearing 210. In other words, the housing 220 acts against the applied force. In this way a closed force-transmission path 280-1; 280-2 is produced. The force-transmission paths 280-1 and 280-2 shown here represent, for example, two possible courses, which may depend on a displacement direction of the shaft 260.

Compared to the force-transmission path 170 in FIG. 1, the force-transmission path 280-1; 280-2 has a shorter course. The load structure 200, or in other words an assembly that comprises the housing 220 and the force-transmitting structure 230, can thereby itself compensate (resist) an internally generated force. A load-reaction unit 140, as shown in FIG. 1, can thereby be omitted. Furthermore, a course of the force-transmission path 280-1; 280-2 over a foundation 290, which carries the housing 220, can be avoided. In other words, unlike conventional systems, the foundation 290 does not comprise part of the force transmission path. Here the foundation 290 is stationary and fixedly connected to the housing 220. Therefore force effects on the foundation 290 up to a weight of the load structure 200 can be reduced, and requirements with respect to the stability of the foundation 290 can optionally be reduced. Installation space can also be saved due to the omission of the load-reaction unit 140.

In FIG. 2 the counter ring 250 is indirectly connected to the housing 220 via a force-receiving element 295. The force-receiving element 295 is located on an outside of the housing. In other words, the outside is a side facing away from a volume enclosed by the housing. The large bearing 210 is likewise located on the outside of the housing. This can make a test object like the large bearing 210 more accessible, more visible and/or more reachable. Thus it may be possible to better monitor load tests, or to attach additional sensors to the test object. Additional sensors can optionally be attached to the large bearing 210, for example, a strain gauge strip for measuring deformation, a temperature sensor for measuring an operating temperature of the large bearing (e.g. arising frictional heat) or a lubricant temperature, or also an acceleration sensor.

In some exemplary embodiments the force-receiving element 295 can be manufactured from a material that has a higher degree of hardness than a material of the housing 220. The force-receiving element can be annular or partial-ring shaped (in other words, segmented). In addition, a plurality of force-receiving elements 295 can be attached to the housing, which provide fixing points for connecting the counter ring 250. For example, the housing 220 can comprise at least three bores. The at least three bores are configured to receive an attachment device for attaching the force-receiving element 295 on the housing, e.g., a screw, a rivet, or a bolt, and optionally have a thread. The fixing points thus provided can thus span a plane, which comprises a contact surface for the counter ring 210 when the force is acting. In this way a stability of the load structure 200 can be increased during a test.

In FIG. 2, the load structure 200 further comprises an adapter ring 285 that has a radial indentation. The adapter ring 285 is configured to couple the force-transmitting structure 230 onto the bearing ring 240 of the large bearing 210 such that the bearing ring 240 is in abutment with the radial indentation. Thus an individual adapting of the load structure 200 to test objects of different sizes can be performed. Optionally or alternatively, a further adapter ring can be provided between the force-receiving element 295 and the counter ring 250. In this way, for example, a difference between a radial expansion of the bearing ring 240 and a radial expansion of the counter ring 250 can be compensated.

The housing 220 may be manufactured at least partially from a material whose mass fraction of iron is greater than its mass fraction of any other element. The material can additionally have a carbon mass fraction of up to 2 percent. In other words, the material can be an alloy, for example, steel. The material can further comprise, for example, nickel, chrome, tungsten, molybdenum, vanadium, cobalt, sulfur, or manganese. Furthermore, the housing 220 can comprise further materials, e.g. concrete or reinforced concrete.

FIG. 3 shows an exemplary embodiment of a method 300 for testing a loadability of a large bearing. The method 300 comprises generating 310 a force by a force-transmitting structure of the load structure relative to a housing of the load structure on a bearing ring of the large bearing. The method 300 additionally comprises supporting 320 a counter ring of the large bearing against the housing, indirectly via a force-receiving element connected to the housing. A material of the force-receiving element may have a higher degree of hardness than a material of the housing. The method 300 further comprises transmitting 330 the force via the counter ring and the force-receiving element at least partially to the housing.

Again in other words, exemplary embodiments offer the possibility of manufacturing a load structure for testing a bearing with a load acting on the bearing. The load structure can be embodied, for example, as a hydrostatic load device. Components or material can be saved using the teachings of the present disclosure since the load structure can reabsorb a force generated on the bearing. In this way a force transmission path can be shortened. In some exemplary embodiments a force-receiving element in the shape of an aperture disc is used for this purpose, which is connected to the housing and is in contact or abutment with the bearing. Under certain circumstances this can save costs in a test of a bearing. Furthermore, a stiffness of the load structure can be improved in comparison to conventional solutions. In this way control elements for generating the force on the bearing (e.g. hydraulics, actuators, etc.) can possibly be operated more efficiently. In this way the bearing to be tested can be more visible, which, for example, can facilitate an inspection or monitoring during a test process, or can make possible an attaching of additional sensors to the bearing. In addition, installation space can optionally be reduced.

The above-described exemplary embodiments represent only an illustration of the principles of the present invention. It is understood that modifications and variations of the arrangements and details described herein will be clear to other persons of skill in the art. It is therefore intended that the invention be limited only by the scope of the following patent claims, and not by the specific details which have been presented with reference to the description and the explanation of the exemplary embodiments.

The features disclosed in the foregoing description, the following claims, and the accompanying Figures can be meaningful and can be implemented both individually as well as in any combination for the realization of an exemplary embodiment in its various designs.

REFERENCE NUMBER LIST

100 Device
110 Large bearing
120 Foundation
130 Load-generating unit
140 Load-reaction unit
150 Shaft
160 Motor
170 Force-transmission path 200 Load structure
210 Large bearing
220 Housing
230 Force-transmission structure
240 Bearing ring
250 Counter ring
260 Shaft
270 Motor
280-1; 280-2 Force-transmission path
285 Adapter ring
290 Foundation
295 Force-receiving element
300 Method
310 Generating
320 Supporting
330 Transmitting

The invention claimed is:

1. A load structure for testing a loadability of a large bearing comprising:
   a housing;
   a force-transmitting structure configured to generate a force or a moment relative to the housing and to transmit the force or the moment to a bearing ring of the large bearing; and
   a force-receiving element connected to the housing and configured to contact a counter ring of the large bearing,
   wherein the housing is configured to support the counter ring indirectly via the force-receiving element such that the transmitted force or moment is transmitted to the housing at least partially via the counter ring and the force-receiving element,
   wherein a material of the force-receiving element has a higher degree of hardness than a material of the housing, and
   wherein the force-receiving element is configured such that no bearing rolling elements are located axially between the bearing ring and the housing when the force-receiving element contacts the counter ring.

2. The load structure according to claim 1, wherein the force-transmitting structure further comprises a shaft connected to the bearing ring, and wherein the shaft is configured to transmit the force or the moment to the bearing ring in a radial or an axial direction.

3. The load structure according to claim 1, wherein the housing comprises at least three bores configured to receive a fastener for attaching the force-receiving element to the housing.

4. The load structure according to claim 1, wherein the force-receiving element is at least partial-ring shaped.

5. The load structure according to claim 1, further comprising an adapter ring having a radial indentation, the adapter ring being configured to couple the force-transmitting structure to the bearing ring of the large bearing with the bearing ring in abutment with the radial indentation.

6. The load structure according to claim 1, wherein the housing is manufactured at least partially from a material whose mass fraction of iron is greater than its mass fraction of any other element.

7. The load structure according to claim 1, wherein the force-transmitting structure further comprises a shaft connected to the bearing ring, and wherein the shaft is configured to transmit the force or the moment to the bearing ring in a radial or an axial direction,
   wherein the housing comprises at least three bores configured to receive a fastener for attaching the force-receiving element to the housing,
   wherein the force-receiving element is at least partial-ring shaped, and
   wherein the housing is manufactured at least partially from a material whose mass fraction of iron is greater than its mass fraction of any other element.

8. The load structure according to claim 1, wherein the force-transmitting structure comprises a piston and wherein the force-receiving element comprises at least one body projecting from the housing.

9. A method for testing a loadability of a large bearing using the load structure of claim 1, the method comprising:
   supporting the counter ring of the large bearing against the housing indirectly via the force-receiving element; and
   generating a force or a moment with the force-transmitting structure on the bearing ring of the large bearing.

10. The method according to claim 9, further including transmitting the force or the moment to the housing at least partially via the counter ring and the force-receiving element.

11. A method for testing a loadability of a large bearing having a ring and a counter ring comprising:
    providing a housing having a piston projecting from the housing and a force-receiving element projecting from the housing and then decreasing a distance between an axial side surface of the counter ring and the force-receiving element and decreasing a distance between an axial side surface of the ring and the piston until the axial side surface of the ring contacts the piston and the axial side surface of the counter ring contacts the force-receiving element;
    connecting the axial side surface of the counter ring to the force-receiving element; and
    generating a force or a moment against or on the bearing ring of the large bearing relative to the housing such that the force or the moment is transmitted to the housing at least partially via the counter-ring.

12. The method of claim 11 wherein the bearing is a rolling-element bearing and wherein the force-receiving element is an at least partial ring shaped body.

13. The load structure according to claim 1, wherein the force-transmitting structure and the force-receiving element are configured such that the bearing ring and the counter ring lie entirely to a first side of a plane and the force-receiving element lies entirely to a second, opposite side of the plane when the force-receiving element contacts the counter ring.

14. The load structure according to claim 1, wherein the force-receiving element lies entirely radially outside the bearing ring when the force-receiving element contacts the counter ring.

15. The load structure according to claim 14, wherein the force-transmitting structure and the force-receiving element are configured such that the bearing ring and the counter ring lie entirely to a first side of a plane and the force-receiving element lies entirely to a second, opposite side of the plane when the force-receiving element contacts the counter ring.

16. A load structure for testing a loadability of a large bearing comprising:
    a housing;
    a shaft configured to generate a force or a moment relative to the housing and to transmit the force or the moment to a bearing ring of the large bearing; and
    an at least partial ring-shaped body connected to the housing and configured to contact a counter ring of the large bearing,
    wherein the housing is configured to support the counter ring indirectly via the at least partial ring-shaped body such that the transmitted force or moment is transmitted to the housing at least partially via the counter ring and the at least partial ring-shaped body, wherein a material of the at least partial ring-shaped body has a higher degree of hardness than a material of the housing, and wherein the at least partial ring-shaped body lies entirely radially outside the bearing ring when the at least partial ring-shaped body contacts the counter ring.

17. The load structure according to claim 16, wherein the force-receiving element is configured such that no bearing rolling elements are located axially between the bearing ring and the housing when the at least partial ring-shaped body contacts the counter ring.

18. The load structure according to claim 16, wherein the force-transmitting structure and the force-receiving element are configured such that the bearing ring and the counter ring lie entirely to a first side of a plane and the at least partial ring-shaped body lies entirely to a second, opposite side of the plane when the at least partial ring-shaped body contacts the counter ring.

19. The load structure according to claim 18, wherein the force-receiving element is configured such that no bearing rolling elements are located axially between the bearing ring and the housing when the at least partial ring-shaped body contacts the counter ring.

* * * * *